(12) United States Patent
Trioano et al.

(10) Patent No.: US 7,403,788 B2
(45) Date of Patent: Jul. 22, 2008

(54) SYSTEM AND METHOD TO INITIATE A MOBILE DATA COMMUNICATION UTILIZING A TRIGGER SYSTEM

(75) Inventors: Michael Trioano, Shrewsbury, MA (US); Mark Grindeland, Framington, MA (US); Gerald Hewes, Lexington, MA (US); Eswar Priyadarshan, West Roxbury, MA (US); Randall Snyder, Campbell, CA (US)

(73) Assignee: M-Qube, Inc., Watertown, MA (US)

( * ) Notice: Subject to any disclaimer, the term of this patent is extended or adjusted under 35 U.S.C. 154(b) by 0 days.

(21) Appl. No.: 10/521,521

(22) PCT Filed: Jul. 18, 2003

(86) PCT No.: PCT/US03/22661

§ 371 (c)(1),
(2), (4) Date: Jan. 18, 2005

(87) PCT Pub. No.: WO2004/010257

PCT Pub. Date: Jan. 29, 2004

(65) Prior Publication Data

US 2006/0136546 A1    Jun. 22, 2006

Related U.S. Application Data

(60) Provisional application No. 60/397,435, filed on Jul. 19, 2002.

(51) Int. Cl.
    H04Q 7/20    (2006.01)
(52) U.S. Cl. ............... 455/466; 455/412.1; 455/414.1; 455/432.3; 455/41.2

(58) Field of Classification Search .............. 455/412.1, 455/412.2, 414.1, 432.3, 41.2; 205/25; 209/23; 213/85; 240/5.82; 379/142
See application file for complete search history.

(56) References Cited

U.S. PATENT DOCUMENTS

| 6,560,651 | B2* | 5/2003 | Mott et al. ................... 709/229 |
| 7,139,565 | B2 | 11/2006 | Fiatal et al. |
| 2002/0160776 | A1* | 10/2002 | Torabi ........................ 455/435 |
| 2003/0005066 | A1 | 1/2003 | Lazaridis et al. |
| 2003/0074328 | A1* | 4/2003 | Schiff et al. .................. 705/75 |
| 2003/0100315 | A1 | 5/2003 | Rankin |
| 2003/0187938 | A1 | 10/2003 | Mousseau et al. |

OTHER PUBLICATIONS

PCT International Search Report, PCT/US03/22661, 4 pages.

* cited by examiner

*Primary Examiner*—David Q. Nguyen
(74) *Attorney, Agent, or Firm*—Blakely, Sokoloff, Taylor & Zafman, LLP; Judith A. Szepesi

(57) ABSTRACT

A system and method to enable a user to initiate a communication with an organization using a mobile communication device by means of a trigger system. A system and method to enable an organization to acquire a user mobile device address by means of a trigger system. A system and method to enable an organization to respond to a user by means of a trigger system and a message application server. A system and method to enable organizations to deliver mobile messages, coupons, offers and promotions to users mobile device by means of a combination of a trigger system, a message application server and an offer application.

34 Claims, 10 Drawing Sheets ably in the United States on brand marketing and commu-
SYSTEM AND METHOD TO INITIATE A MOBILE DATA COMMUNICATION UTILIZING A TRIGGER SYSTEM

PRIORITY CLAIM

This application claims the benefit of priority of U.S. Application No. 60/397,435, filed Jul. 19, 2002, the entire contents of which are incorporated by reference as if set forth at length herein.

FIELD OF THE INVENTION

This invention relates to enabling communications between users and organizations by means of data enabled mobile communication devices. More particularly this inventions relates to a system, method and machine to enable organizations to execute direct marketing techniques and promotions via mobile communication devices.

BACKGROUND OF THE INVENTION

Global brands spend hundreds of billion of dollars annually in the United States on brand marketing and communications. Over the last decade, an increasing percentage of brand marketing budgets have been spent in direct marketing channels (e.g., direct mail, telemarketing, email, etc.). In fact, total brand spending on direct mail now exceeds that of broadcast television. Given direct marketing's unique capabilities, such as precise targeting, the ability to drive specific behaviors, and highly measurable results, marketers are expected to continue spending heavily in direct channels.

One of the most significant new direct marketing opportunities is the emergence of the wireless channel. The wireless channel provides marketers the unmatched ability to reach the individual (not just the household), in a time- and event-sensitive way, with attractive and measurable marketing return on investment ("ROI"). In Europe, hundreds of brands are beginning to utilize the wireless data channels and are committing a sizeable portion of their communications budgets over the next year to wireless.

An organization wanting to use data messaging for communication with its user base needs to make it easy for them to participate. The organization needs to have a means to obtain a user's mobile device address to be able to communicate with him using his mobile device data capabilities. The organization needs to obtain the user permission to be able in the future to send new messages, coupons, offers or promotions, to the user's mobile devices.

There are multiple ways to for a user to initiate a communication with an organization and for an organization to obtain a user's mobile device address, but in this invention we are primarily focused on methods to initiate a communication when said user is in a mobile setting, such as a public environment as opposed to a home or office environment. In a mobile setting, there needs to be an easy and quick way for said user to specify his interest in starting a communication and for the organization to obtain said user's mobile device address whereby the communication can occur.

Once the communication is initiated, a message oriented application can capture the user's mobile device address in a database, and respond back with a message, a coupon, an offer or a promotion.

It is important that said user only receive future organization originated ("push") communications only if he has elected to do so. A system and method to perform communication between users and organizations needs to support an easy way to either opt-in or opt-out from receiving future communications.

An example of a situation where a user may be interested in initiating a communication with an organization is the case of the organization being a brand sponsoring some event; for example a contest, building brand and product awareness where the user may win some prizes. Other examples include receiving offers, coupons, promotions or discounts on their mobile device.

The communication, its goals, its benefits and how a user can initiate it is typically displayed using a traditional channel such as print media, product packaging, bar coaster, bill-board, sign, posters, TV or radio advertisements, candy wraps, etc. . . . This process is called the "call to action" message. It is easy to see that if participating is easy to accomplish, such communications can have a wide impact for both users and organizations.

One very common application of this invention is to deliver coupons, offers and promotions to users that have requested them. There is a cost for an organization to provide, promote and deploy systems to execute such mobile coupon, offer and promotion programs. Hence it is an important requirement that a system be able to measure redemption rates to compute the effectiveness of the program. In addition, much better coupons, offers and promotions can be given to individual users if their past individual receptiveness is known—which makes uniquely identifying the coupon, offer and promotion important.

There is much economical value in being able to deploy a system where users can receive messages, coupons, offers and promotions at the time of their choosing as well as occasionally receiving push specials thereby allowing the organization running the program to develop a comprehensive loyalty program bringing value to both the user and the organization. To support such a program, a system needs to exist to enable users to enroll, participate and receive occasional "push" messages, coupons, offers and promotions that leverages the capabilities of mobile data communication devices and Customer Relationship Management and Loyalty systems.

In addition, some of the offers, coupons and promotions can be valuable enough that the organization giving them out wants to make sure they are used only once. Examples of such compelling offers are very deep discount to join the offer program—think about book clubs that sell you your first three books for $1 to join the club. In this case, the offer needs to be verified that it has not already been redeemed. Such a step is critical with the technologies described in this invention where it is often easy to forward or forge a message on a mobile device.

The primary limitations with existing methods to initiate a communication between an organization and a user using a mobile device have to do with: the time, effort and lack of convenience of triggering the communication using current systems; the lack of common service addresses for users to initiate the communication with an organization in some common existing messaging technologies; and the lack of familiarity on the part of users on how to initiate a communication using their mobile device.

BACKGROUND OF THE INVENTION-PRIOR ART

Obtaining the user's mobile device address in a mobile setting to allow for communication is not always straightforward for some classes of mobile devices, in particular digital cell phones. Almost all digital cell phones sold today have one or more data messaging capabilities. These may include, but is not limited to, Short Message Service ("SMS"), Enhanced Messaging System ("EMS"), Multimedia Messaging Service ("MMS"), Wireless Application Protocol ("WAP") and mobile e-mail. The large number of digital cell phones in the U.S. makes solving the problem of obtaining cell phones data address a critical problem to be solved.

One solution that is used by some wireless carriers to allow a user to initiate a communication using a cell phone with an organization, is to use a Mobile Originated ("MO") message sent to a service access code. In the case of a cell phone, a service access code can either be a short code (a number with less than the regular 10 digits defined by the North American Numbering Plan ("NANP")—for example "2327") or a regular NANP 10 digit number. A user that wants to respond to a "call to action" message sends an MO message to the organization service access code setup by his cell phone carrier.

While the above technique using MO messages works can work in geographies that support standardized service access codes across wireless carriers, it is much less effective in countries that don't. In countries with no standardized service access codes, like the U.S., it is awkward for an organization to publish different service access code addresses for each wireless carrier. In addition the MO technique is not effective in geographies where cell phone users are not familiar on how to send MO messages. The situation is compounded by the fact that some wireless carriers currently do not offer third parties the ability to receive MO messages sent to them.

It is possible to solve the problem of lack of standardized service access codes by using an e-mail address instead of the typical telephone digit numbers used for SMS, EMS and MMS. Using e-mail is possible because most wireless carriers offer the ability for users to send and receive e-mails from their cell phone, either directly using Simple Mail Transfer Protocol ("SMTP") or indirectly via SMS, EMS, MMS, WAP, or hyper text markup language ("HTML") by means of an SMTP gateway provided by the wireless carriers. A service using e-mail as its service address requires that users enter the service e-mail address when composing their initial MO message. Unfortunately, it is often extremely cumbersome for users to enter an e-mail address composed of alphabetical letters and symbols using a cell phone numeric keypad. For example, on a Sony-Ericsson T68i phone it takes 34 key presses (assuming no mistakes) to enter "fun@m-qube.com". Hence user response rates will be extremely low with this approach.

Another alternative that can be used to solve the problem of lack of standardized service access codes is to deploy modem banks of Personal Computer ("PC") based wireless data cards. Said wireless data card is like a miniature cell phone with its own phone number. With the peer-to-peer SMS interoperability available in many countries, any MO message sent to said wireless data card phone number would be delivered to it, and by extension to the message application server connected to said PC. While this approach effectively works around the problem of lack of standardized service access codes, it suffers from severe scalability problems (a card typically cannot handle more that 2-3 messages per second, and most cards are not designed to be operated 24×7×365.)

Another alternative is to use a range of numbers for the service access codes normally allocated to a wireless carrier for use by its subscribers, and reconfigure the carrier data network elements to forward any MO messages sent to said range, not to a physical cell phone, but instead to the organization's message application server using a data network such as the Internet. This solution builds upon SMS interoperability and is scalable. But it requires that the organization have a relationship with the wireless carrier offering said range, that said wireless carrier have the capability to offer this service to organizations, and that other wireless carrier allow this to happen.

An equally critical consideration is the expertise required from users to send an MO message using the native mobile device data messaging interface. In particular, not all cell phone users know how to originate a MO message using their cell phone. Another method is required to allow them to participate before they become more familiar with their cell phone messaging capabilities. Once a cell phone user receives a message, it is much easier to reply to it since most cell phone handsets provide some guidance on how to do so.

Or, the user may be familiar with messaging, but the time involved may be a limiting factor. For example, many users may not be willing because of the inconvenience to text-in a message when entering in a supermarket to receive tailored coupons, but may be more willing to use other methods described in this invention to trigger the offers. This problem is especially acute for mobile messaging technologies that don't rely on number for addresses, but on long strings like e-mail or instant messaging screen names. While presumably it is possible to enter a long string using these mobile devices, this is usually a somewhat slow process. A faster trigger mechanism is required.

Hence existing methods using the native messaging capabilities of a user's mobile device to support mobile originated messages to allow said user to start a communication with an organization service are not effective in many situations or geographies. The limitations of the existing methods makes using the mobile channel as a direct marketing channel not a cost effective channel; as user response rates would be too low to cover the campaign costs.

BACKGROUND OF THE INVENTION-OBJECTS AND ADVANTAGES

The specific object and advantages for this present invention are:

a) Provides for an alternative to using the mobile device native data communication interface in cases where there are no unique service address (common service access codes), no publicly supported service side infrastructure, or the user is unfamiliar with his device data messaging capabilities.

b) Provides for faster and easier methods to trigger a communication between an organization and a user than by using the device native mobile originated messaging capabilities.

c) Some of the embodiments described in the invention, like using an interactive voice response ("IVR") system as the trigger system, make it much easier to collect additional information such as opt-in permission for future communication or offers, or more information, such as offers of interest to the user.

d) Enables simple, fast, practical and economical means to instantly deliver offers, coupons and promotions to users in public places.

Further objects and advantages of this present invention will become apparent from a consideration of the drawings and ensuing description.

SUMMARY OF THE INVENTION

The present solution solves the aforementioned problem not by means of the user mobile device native data messaging services but by means of an external trigger system not based on the user mobile device data messaging capabilities.

Once the trigger system has captured a unique identifier capable of being mapped to the user mobile device address, a Mobile Terminated ("MT") message is sent to the user. From then on, the message application server is capable of future communications. The messages sent to the user can include menus and simple instructions removing the need for the user to ever originate a sophisticated MO message.

In one embodiment of the invention, said unique identifier is the mobile device address itself. In another embodiment of the invention, said unique identifier can be an identifier that is then used to retrieve the mobile device address. An exemplar embodiment uses an account number as the unique identifier, and then retrieving the mobile device address using the account number. The details on how the mobile device address is retrieved using the account number is well known to those skilled in the art. One possible implementation is to store the mobile device address in a database using the account number as the key to a data record holding the mobile device address. Other exemplary embodiments use a loyalty card number, a social security number, a membership number or employer number as the unique identifier.

This invention applies to any message oriented data communication system, including, but not limited to SMS, EMS, MMS, WAP, hypertext markup language ("HTML"), xHTML and other HTML derivatives, mobile e-mail, client side mobile device execution environments such as Java 2 Mobile Edition ("J2ME™"), Brew™, Linux™, or Symbian OS™.

A further aspect of the invention, a system and method is also provided to deliver follow-on messages from the organization once the user mobile device address is captured.

A further aspect of the invention, a system and method is also provided to deliver, an instant mobile coupon, offer, or promotion that can be redeemed providing for a complete system and method to deliver messages, coupons, offers and promotion to users.

In one embodiment, the present solution is a network based system and method, consisting of a trigger system, a message application server and a mobile device service provider system. It allows any user equipped with a mobile device capable of receiving messages to initiate a sequence whereby said user can receive one or more messages from said message application server. Furthermore, said message application server can store said user mobile device address in a database for later communications from said message application server to said user.

The organization service is presented in a traditional media format, including but not limited to, on a print advertisement, on a product packaging, on a bill-board, on a poster, on a flyer, on a coaster, on a candy wrap, on a store display, in a TV ad, in a radio ad, on an Internet site. The presentation includes instructions on how the user can interact with the trigger system. The presentation is called the "call to action" message.

In one embodiment, the trigger system confirms the user mobile device address, handles exceptions, and optionally obtains additional data from the user or opt-in permission if applicable. Once the session with said trigger system is completed, the trigger system informs the message application server which sends a message to the user mobile device.

BRIEF DESCRIPTION OF THE DRAWINGS

The foregoing and other features of the present invention will be more readily apparent from the following detailed description and drawings of the illustrative embodiments of the invention in which.

DETAILED DESCRIPTION OF THE PREFERRED EMBODIMENTS

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Figure 1:
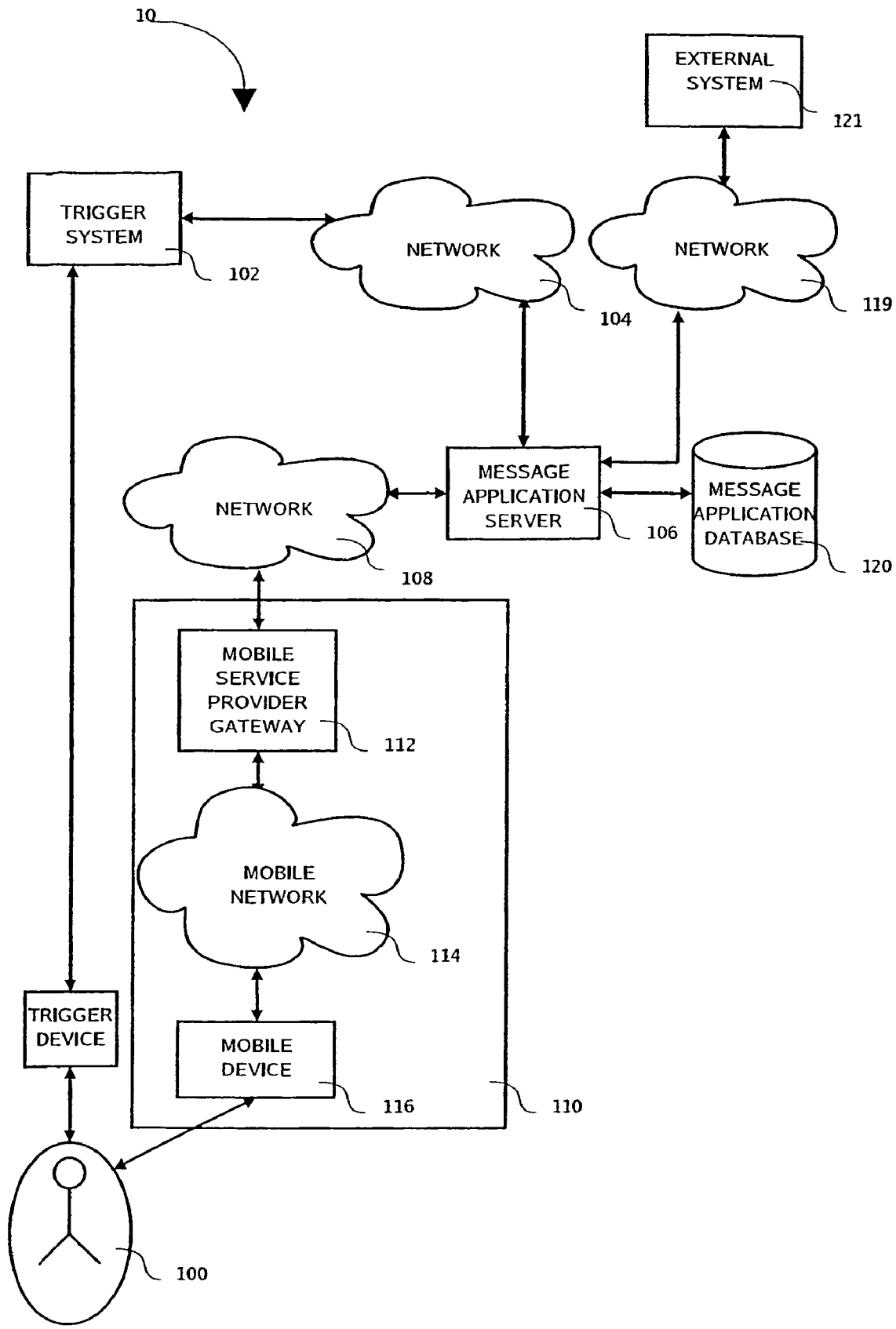
FIGS. 1 and 1B depicts aspects of an exemplary embodiment of the present invention in accordance with the teachings presented herein.
Figure 1B:
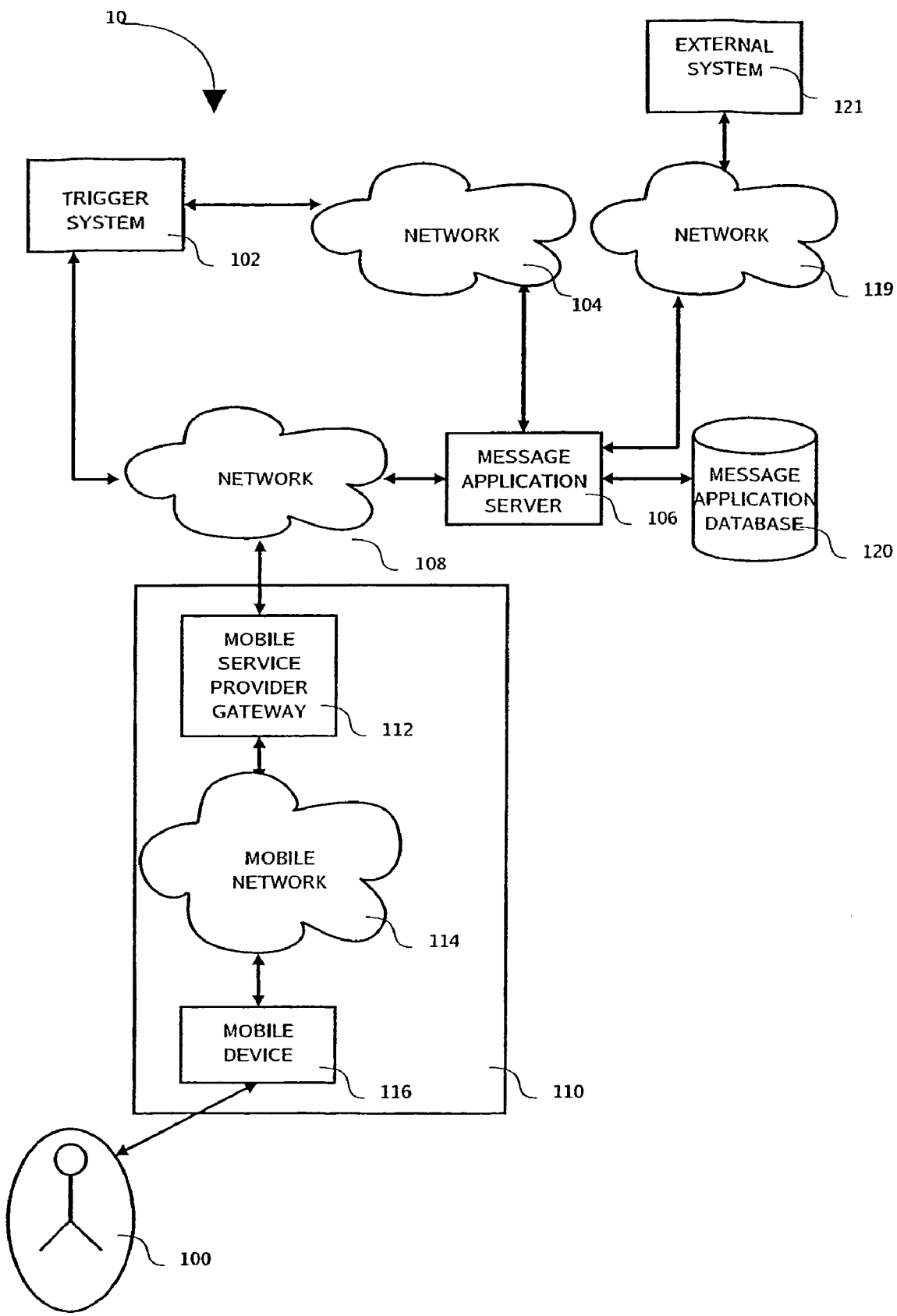

Turning to FIG. 1 there is shown the basic architecture of one embodiment of a system for capturing a user mobile device address by means of a trigger system. The system comprises a trigger system 102 which can be triggered by a user 100 using a trigger device. Said trigger system 102 is connected by means of a data network 104 to a message application server 106. The message application server 106 is further connected to a mobile service provider or carrier system 110 by means of a data network 108 and the mobile service provider gateway 112. The mobile service provider gateway 112 acts as a gateway into the mobile service provider network 114. The mobile service provider gateway 112 is further capable of sending messages to the user 100 mobile device 116 by means of the service provider mobile network 114. Said user 100 can then read messages sent to his mobile device 116.

The trigger system 102 is any system capable of capturing a unique identifier capable of being transformed into the user mobile device 116 messaging address, and optionally other data. The system described in this invention requires that the trigger system 102 or the message application server 106 be able to directly or indirectly retrieve the mobile device 116 address based on said unique identifier captured by the trigger system 102, and be able to use the mobile device address to send messages to the mobile device 116. Once the trigger system 102 is triggered by user 100, it sends said mobile device messaging address or said user unique identifier along with any other captured data to the message application server 106 by means of data network 104.

The trigger system 102 can be triggered by the user either by using his mobile device 116, or by using any other system or method.

In one exemplary embodiment of this invention, the trigger system is a computing device equipped with a card reader where the magnetic stripe of the card contains said unique identifier.

In one exemplary embodiment of this invention, the trigger system is a computing device equipped with a bar code reader. The user swipes an object with a bar code containing said unique identifier, such as a key chain card.

In one exemplary embodiment of this invention, the trigger system consists of Radio Frequency Identification ("RFID") readers located in public areas, for example at the doors of stores. The user carries an object with an embedded Radio Frequency Identification RFID tag containing said unique identifier. The trigger system is simply triggered by the user when walking through or near the RFID readers.

In one exemplary embodiment of this invention, the trigger system is a client application running on the user mobile device combined with a server side system. The communication is triggered when the user activates the application and instructs it to trigger the interaction. The client application, by means of the data messaging capabilities of the mobile device notifies the service side system, which can be the message application server, to initiate the communication.

In one exemplary embodiment of this invention, the trigger is a client application running on the user mobile device combined with a local receiver system. The communication is triggered when the user activates the application and instructs it to trigger the interaction. The client then uses a local networking infrastructure such as infra red, Bluetooth®, WiFi or any other local wireless protocol to send the trigger to said receiver system which forwards it to the message application server.

In one exemplary embodiment of this invention the trigger system is any system capable of performing biometric or user identification of said user. Examples of such system include but is not limited to finger-print readers, eye readers, voice identification and video camera identification.

In one exemplary embodiment of this invention, the trigger system is a kiosk where the user enters the unique identifier in the kiosk—for example using a keyboard, a keypad or a touchscreen.

In one exemplary embodiment of this invention, the trigger system 102, is an IVR system accepting phone calls which is programmed to capture said unique identifier. Various techniques known to those of skill in the art can be used to capture said unique identifier. This includes but is not limited to accepting Dual Tone Multi Frequency ("DTMF") or using voice recognition. The user triggers an interaction with the system by calling a phone number mapping to the IVR system and entering at the prompt said unique identifier and any additional data requested by the IVR. At the end of the call, all the captured information is forwarded to the message application server.

In one embodiment of this invention, the trigger system 102 is an IVR system and the mobile device 116 is a data enabled cell phone or any data device capable of receiving messages sent to a phone number address as described previously. In such embodiment, the IVR system can be further programmed to automatically capture the calling number. Capturing the calling number is very common in IVR systems using the Public Switch Telephone Network ("PSTN") Caller Id infrastructure. If the phone call is made using said cell phone, and the calling number is made available to the IVR, then the step of capturing the cell phone number can be further accelerated by spelling out the number and asking the user to validate the number. For example, the confirmation can be achieved using the following message: "You called from XXX-XXX-XXXX, if this is correct press 1, to enter a different phone number press 2". If the user confirms the number then the IVR can move on to capturing the optional data. If the user does not confirm the number, then the IVR can prompt the user for a new mobile device phone number. This last case is useful for example if the user called from a land based line and the IVR recognized the land line number. If the IVR does not receive the calling number from the PSTN, then the IVR system is programmed to directly prompt the user for his mobile device phone number.

In one exemplary embodiment, the trigger system 102 is wireless card attached to a computing device as described earlier. In the prior art section, we mentioned that wireless data cards suffer from scalability limitations. In this embodiment of the invention, the wireless data card is used only as a trigger system to receive the first MO message. All follow-on messages can then be sent to the user mobile device 116, using the mobile device 116 mobile service provider specific short code for this program. This invention overcomes the lack of standardized short codes in certain geographies and the lack of scalability of PC based wireless cards by using the wireless card only as a trigger system and not for subsequent message delivery. For example, the user would send an initial MO message to the wireless data card number, say NNN-NNN-NNNN which would be routed to the wireless data card using the carrier peer-to-peer infrastructure. The response from the message application server 106, would then use a separate service address for each carrier. Carrier A may use a five digit short code XXXXX, carrier B a six digit short code XXXXXX, and carrier C a normal ten digit number MMM-MMM-MMMM. When the user receives the message, he can easily reply back and the fact that each user may be using a different address because they have a different wireless carrier is not an issue.

In one exemplary embodiment, the trigger system 102 is a phone switch. The phone switch is connected to the PSTN SS7 network. Upon receiving a call establishment request, the phone switch would refuse such request, capture the user calling number and forward said caller number to the message application server 106. The advantage of this embodiment is that neither the user nor the organization is billed for the call, since it was not completed, and the organization does not incur an IVR cost. The downside is additional data cannot be captured on the user, and the end user experience is probably strange as the call is not accepted.

In another embodiment, the trigger system is a computing device where the user supplies her mobile device address connected to the message application server using a data network, including but not limited to the Internet. In another embodiment, the trigger system is a network accessible computing device that the user connects do using another device—for a example a web and WAP application accessed from a client computer using a browser—connected to the message application server using a data network.

The presented embodiments for the trigger system 102 are illustrative only and not limited to the ones presented. Numerous other embodiments of the trigger system 102 are contemplated as falling within the scope of this invention.

The data network 104 is any data network using any messaging protocol. In one exemplary embodiment, the network is based on TCP/IP and the trigger system 102 forwards the unique identifier and optional data using a Web Service call based on the Simple Object Access Protocol ("SOAP".)

The message application server 106 is any computing server designed to process messages. It is programmed to be able to execute instructions upon receiving incoming messages from mobile devices, such as mobile device 116, and from any other external source. One of the instructions that the message application server is capable of executing is sending messages out to mobile devices. One of the event requests capable of triggering the message application server 106 to execute said instructions is the receipt of a notification that a user triggered the trigger device 102.

In one exemplary embodiment, the message application server 106 is implemented as a cluster of Jave 2 Enterprise Edition ("J2EE™") components running on commonly available computer hardware running commonly available operating systems. In one exemplary embodiment, the message application server 106 is implemented using the Jboss™ Java application server and uses an Oracle® database to maintain persistent data. In one exemplary embodiment the dialog instructions to execute upon receiving an MO message or a trigger requests are implemented in one or more extensible markup language ("XML") document(s). Multiple other embodiments of the message application server are possible and known to those of skill in the art.

In one preferred embodiment, the message application server 106 is additionally connected to a message application database 120. The database can be used as part of the implementation of the message application server. In one exemplary embodiment, the database stores data on the active communication programs, including but not limited to, program data; user data; user session data; system logs. The usage of a database to implement sophisticated server applications is well known to those of skill in the art and many possible usage of the database is possible and within the scope of this invention.

The message application server 106 is connected to one or more service provider gateway 112 using any suitable data network 108. In an exemplary implementation, the data network is the Internet using a virtual private network ("VPN") using the short message peer-to-peer ("SMPP") protocol. Other exemplary implementations use the Internet without a VPN, use private TCP/IP based connections ("leased line"), or use a dedicated X.25 connection or any other available data network and protocol. The message application server 106 can simultaneously support multiple mobile service providers systems 110 and mobile device 116 technologies and hence can be connected to multiple service providers systems 110. The message application server 106 can be similarly connected a plurality of trigger system 102.

The message application server 106 can send, and optionally receive, messages to and from the mobile device 116, by means of the mobile service provider system 110. The actual details of the mobile service provider infrastructure are not relevant to this present invention and in practice take many forms.

In one exemplary embodiment, the mobile provider system 110 is broken down into a mobile service provider gateway 112 responsible for interfacing with the message application server 106 by means of data network 108. Using methods known to those skilled in the art, messages can be exchanged between mobile devices, such as mobile device 116 and the mobile service provider gateway 112 by means of a mobile network 114.

The mobile device 116 is any device a user can carry along with him that is capable of receiving data messages from at least the message application server 106 by means of the service provider system 110. In general, the mobile device 116 is also capable of sending messages to the message application server 106 as well as being able to send and receive messages to other mobile devices and other service applications. More capable devices can also send messages, or send and receive more complex messages than text messages such as multi-media messages.

In one embodiment of the invention, the mobile device 116 is a data enabled cell phone, or any data device capable of receiving and sending messages sent to a phone number address. The later can include wireless enabled personal data assistants ("PDA") or any other computing device capable of receiving messages sent to a phone number.

In one exemplary embodiment of the invention, the mobile device 116 is a data capable device capable of receiving and sending messages using e-mail protocols, including but not limited to SMTP, Post Office Protocol ("POP") and Internet Message Access Protocol ("IMAP").

In one exemplary embodiment of this invention, the mobile device 116 is a data capable device capable of receiving and sending messages using a client application that uses a data network, including but not limited to the Internet protocol ("IP"). The mobile device can use any IP transport, including but not limited to 801.11, 801.11a, 801.11b, 801.11g and Wifi.

In one exemplary embodiment of the invention, the mobile device 116 is a data capable device capable of receiving and sending messages using an instant messaging protocol. Examples of instant messaging service provide include, but is not limited to, AOL Instant Messenger™, Yahoo!® Messenger, MSN® Messenger, Jabber® and other similar protocols.

Figure 2:
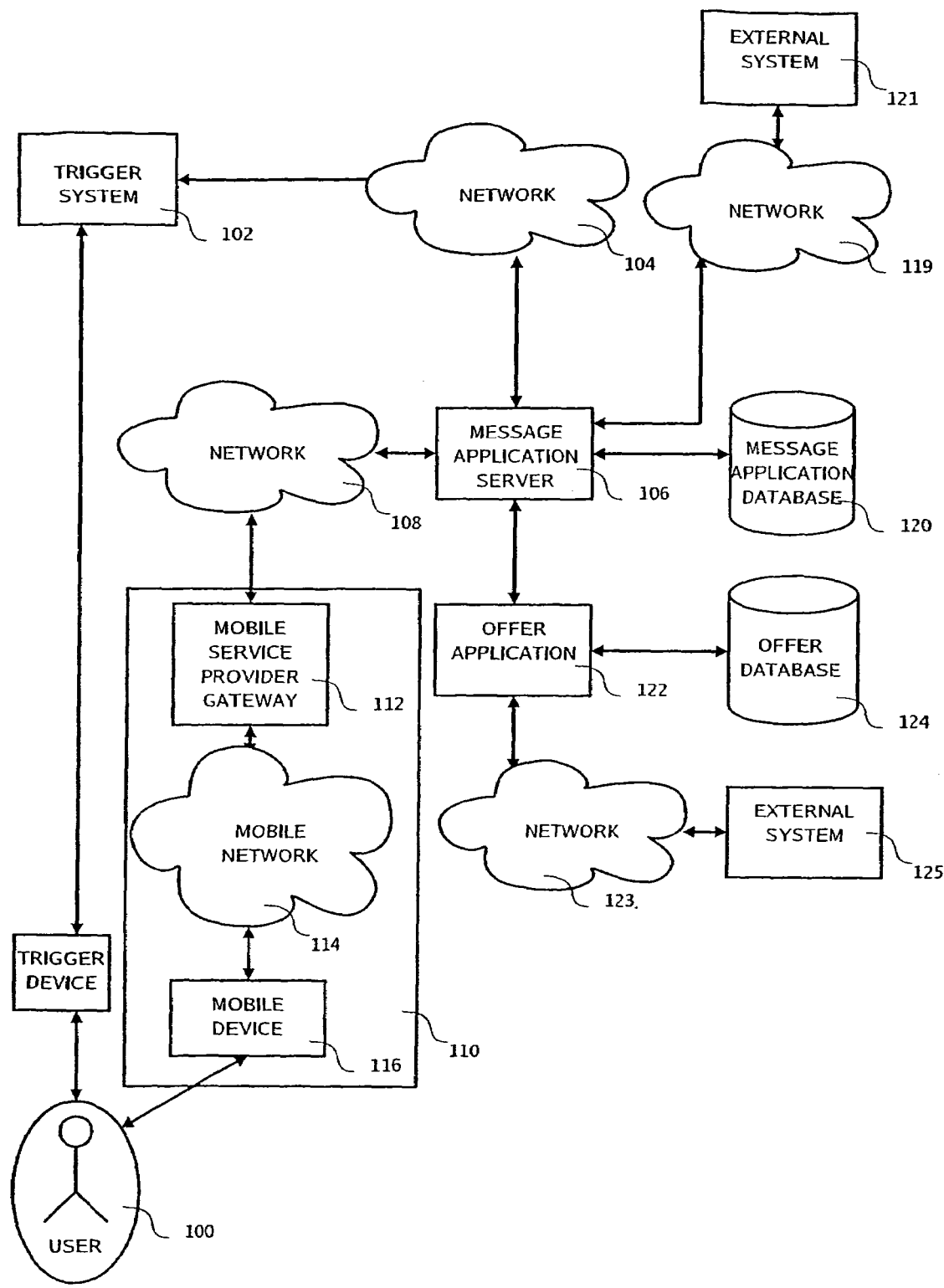
FIG. 2 depicts an alternative exemplary embodiment of the present invention in accordance with the teachings presented herein containing additional components to deliver messages, coupons, offers or promotions.

Turning to FIG. 2 there is shown a block diagram of an embodiment of the invention further comprising components to deliver coupons, offers and promotions to the user. The message application server 106 is further connected to an offer application 122. The offer application 122 is connected to an offer database 124.

The offer application 122 is responsible for selecting and creating coupons, offers and promotions for said user 100. The coupon, offer or promotion is part of the message that will be sent to the user device 16 as described above.

In one embodiment, the coupons, offers and promotions are implemented using an offer message. In a preferred embodiment, the coupons, offers and promotions are implemented using an offer code and an offer message. In one exemplary embodiment, the coupon and promotion offers are represented by numerical codes. In one exemplary embodiment, the coupons and promotion offers are represented by alphanumerical codes. In one embodiment, the coupons, offers and promotions are implemented using data, including but not limited to text data, XML data and binary data, which is interpreted by an application running on said user mobile device 116. In one exemplary embodiment, the coupons and promotion offers are represented by graphical images—including bar codes.

In one exemplary embodiment each user receives the same coupon, offer or promotion code. In another exemplary embodiment, each coupon, offer or promotion code is unique and encodes the coupon, offer or promotion and a user identification. In one exemplary embodiment, the user identification is a sequence number, a short 3-5 digit sequence, allowing the encoding of 1000-100,000 unique users. Each time a user triggers the system and a message, coupon, offer or promotion is generated, a new sequence number is generated and stored in the offer database with the generated offer. At redemption time, the sequence number is extracted from the offer code and the most recent offer with the same offer and sequence number is matched. The benefit of this exemplary embodiment is to keep the unique identifier short in the common case that the code is manually entered at redemption time. In most retail environments, the speed of customer checkout is critical and the more digits need to be entered, the longer it takes to capture the message, coupon, offer or promotion code and the more likely an input error will be made.

In one preferred embodiment, the message, coupon, offer or promotion code includes a checksum digit, using any of the well know checksum algorithms, including but not limited to the mod 10 algorithm used in credit card numbers, whereby invalid coupon, offer or promotion codes due to input errors can be determined.

These various embodiments of coupons and promotion offers are illustrative only and not limiting, therefore numerous other embodiments of coupons, offers and promotions on mobile devices fall within the scope of this invention The offer database 124 is used by the offer application 122 to store available offers, to maintain user profile information concerning coupons, offers and promotions, to maintain logs of created offers. The usage of database to implement sophisticated server applications is well known to those of skill in the art and many possible usage of the database is possible and within the scope of this invention.

In one preferred embodiment, the offer application 122 is connected to an external system 125 comprising enterprise systems, customer relationship management ("CRM") systems or loyalty systems that are involved in the generation, redemption and analysis of the offers.

Internal details of the offer application and the coupon, offer and promotion codes is not discussed in further details as they are known to those skilled in the art. Coupling and all the issues around generating coupons, matching coupons to users based on multiple parameters including past interaction and demographic data is a well established industry. All these coupling techniques apply to the coupon generation and fall into the scope of this invention.

Figure 3:
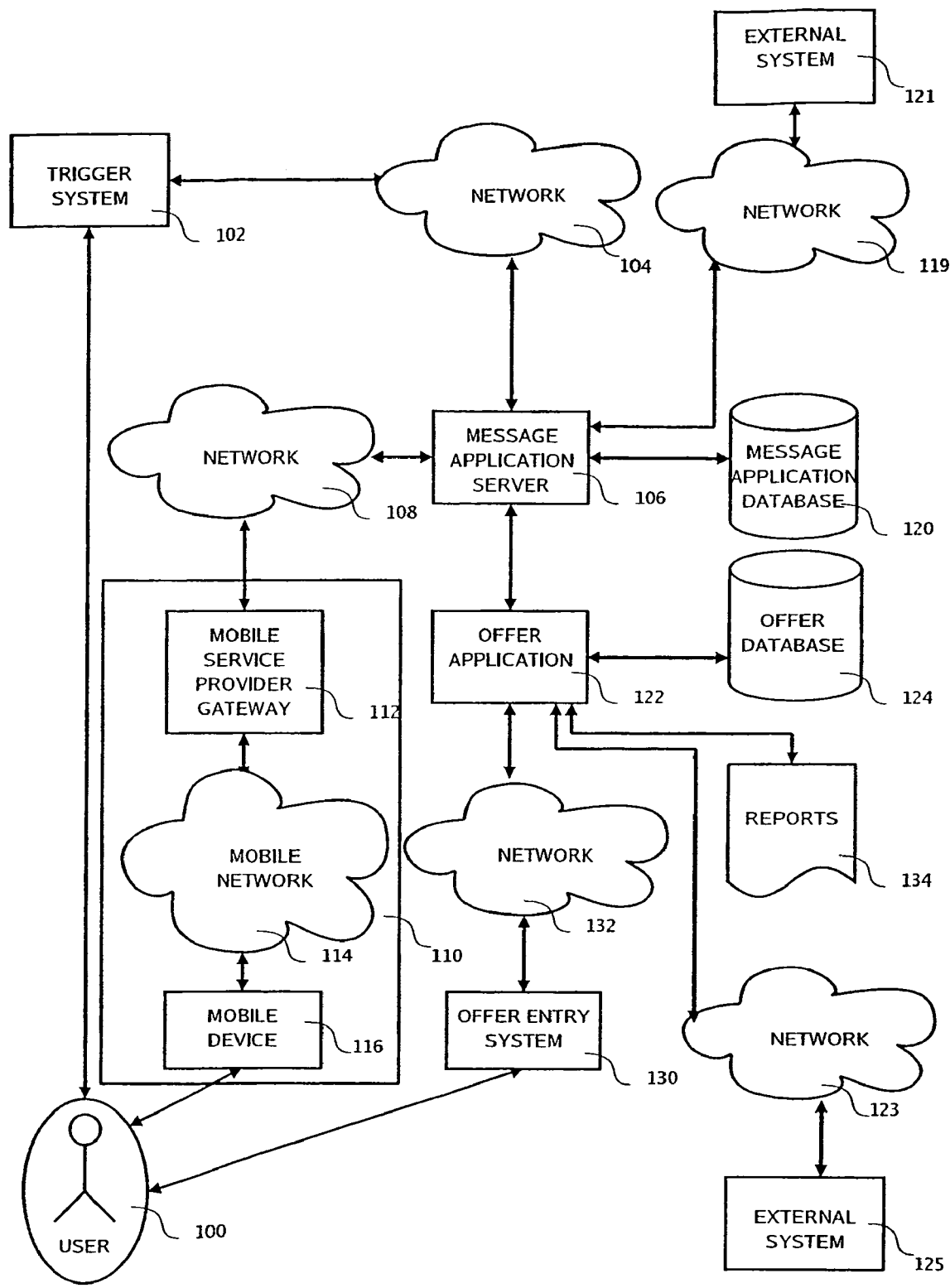
FIG. 3 depicts an alternative exemplary embodiment of the present invention in accordance with the teachings presented herein containing additional components to to track the redemption of coupons, offers or promotions.

Turning to FIG. 3 there is shown a block diagram of an embodiment of the invention further comprising components to track the redemption of coupons, offers or promotions. The system further comprises above FIG. 2, an offer entry system 130 used to validate and capture coupons, offers, and promotions redemption. The offer entry device 130 is connected to the offer application 122 by means of a data network 132. Optionally, an external system 121 or 125 interfaces with either the message application server, the offer application or both.

In one embodiment, the offer entry system validates the coupon, offer or promotion code. In one embodiment, the offer entry system captures the coupon, offer or promotion redemption for storage in the offer database 124. In one preferred embodiment, the offer entry system validates and captures the coupon, offer or promotion code for storage in the offer database 124.

In one preferred embodiment, the offer entry system 130 is a computing device located where the coupon, offer or promotion is redeemed. The coupon, offer or promotion code is entered at redemption time. In this preferred embodiment the coupon, offer or promotion code is validated in real-time by checking the code on the offer entry system 130 (for example the offer code can contain a checksum that is verified), then by sending a request by means of data network 132 to the offer application 122, that verifies the coupon, offer or promotion code. In this exemplary embodiment, redemption data can be analyzed by the offer server 122 and reports 134 created.

In one preferred embodiment, the offer entry system is a point of sale ("POS") terminal programmed to implement the logic described above. If the coupon, offer or promotion code is validated in real-time preventing fraud and providing for duplicate checking, it is possible to offer valuable coupons, offers and promotions that otherwise might not be economical to provide without such checks.

In an exemplary embodiment, the offer entry system 130 is a stand-alone computing device, for example a kiosk. The user enters the coupon, offer or promotion code in the offer entry system 130, and the offer entry system prints out a paper coupon. The user can then redeem the paper coupon like regular paper coupons. In an exemplary embodiment, the offer entry system 130 locally stores each redemption, and the data can be uploaded on a regular basis, by means of a data network 132 to the offer application 122. In an exemplary embodiment the offer entry device 130 is equipped with removable storage. On a regular basis the removable storage is replaced and the content is read on a compatible device and the data uploaded to the offer application 122.

In one exemplary embodiment, the coupon, offer or promotion code has the same format as a payment number like a credit card number. The existing payment processing infrastructure is used to authorize and capture coupon redemption. The operator of the system described in this invention would request a unique bank id prefix to distinguish its offer numbers from credit or payment card numbers. In one exemplary embodiment, said payment processing infrastructure is configured to track coupon, offer and promotion redemption and credit the user for his coupon, offer and promotion.

The data network 132 is any data network or any means using any messaging protocol or data representation not necessarily always connected allowing for the transfer of data, in real-time or in batch mode, from the offer entry device 130 to the offer application 122. In one preferred embodiment, the network is based on the Internet Protocol.

Figure 4:
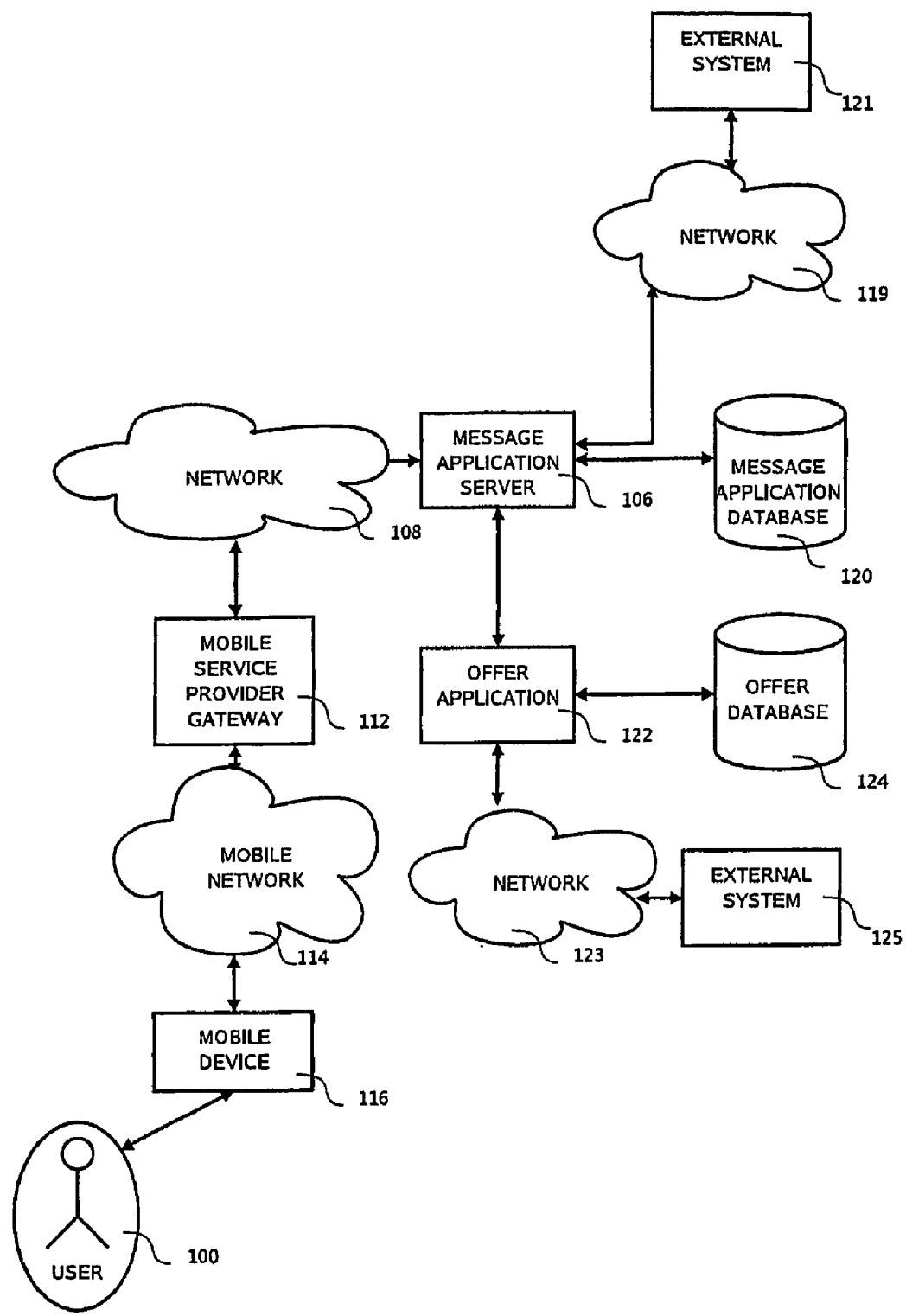
FIG. 4 depicts an exemplary embodiment of delivering follow-on Mobile Terminated messages once the user mobile device address is known.

Turning to FIG. 4 there is shown a block diagram of an embodiment of the invention illustrating how follow-on messages can be sent at later dates to said user 100. Messages, coupons, offers and promotions are delivered immediately upon the user activating the trigger system 102.

But the organization, can also decide to send further messages, coupons, offers and promotions to users that have participated previously. Under this scenario, during the initial communication, the message application server 106, or the offer server 122 stores the mobile device 116 address. At a later date, when the organization wants to push out new messages, coupons, offers or promotions, the list of users that have participated is looked up. If the message includes a coupon, offer or promotion, it may be looked up by the offer application 122 using a mechanism similar to the one described above. The push message is then delivered to the user using the same system and method described earlier.

Figure 5:
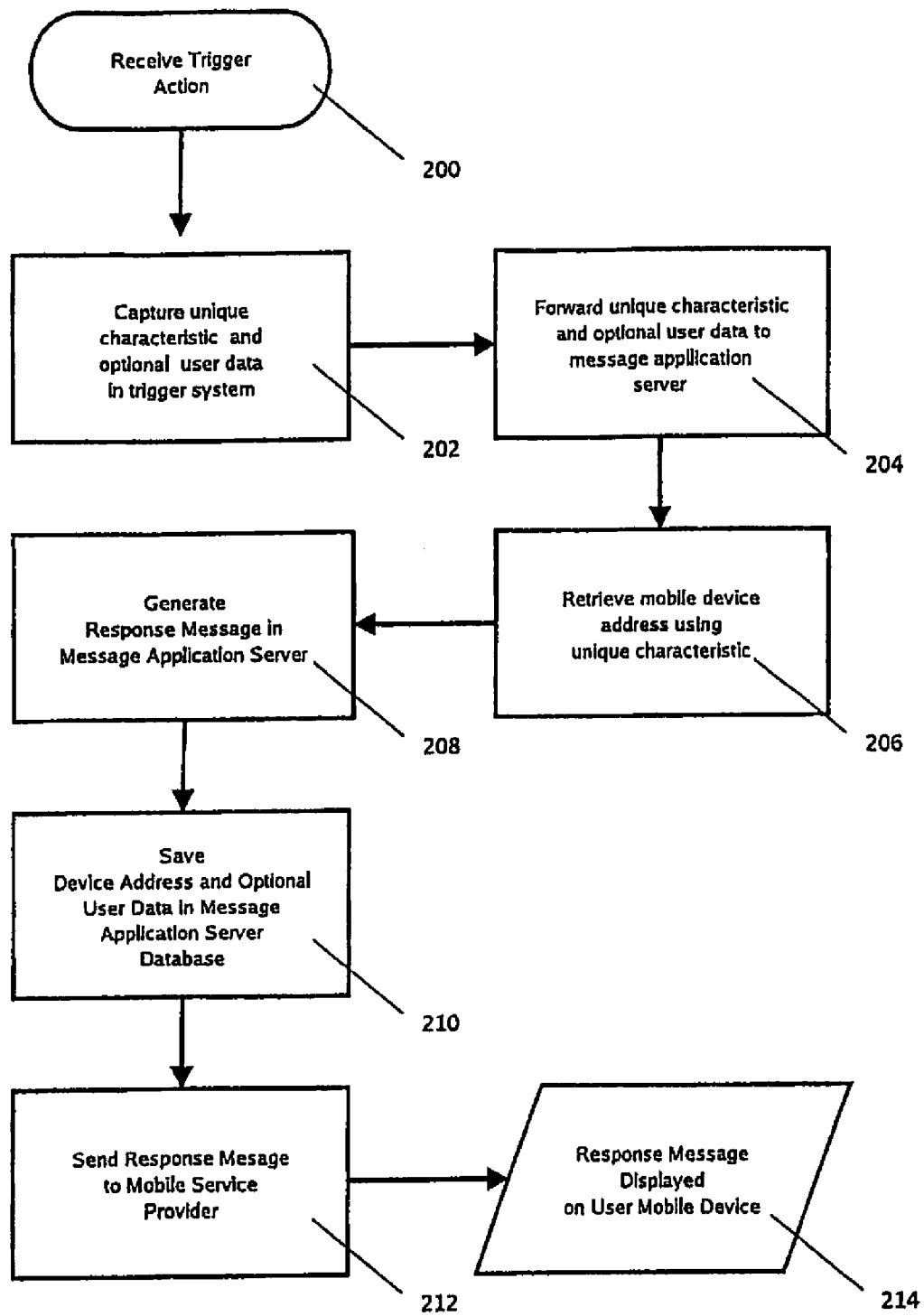
FIG. 5 is a functional block diagram of the method of capturing a user mobile device address and using it to send a message to the user.

FIG. 5 illustrates the basic steps of the invention. In a typical usage of the invention, the user 100 is encouraged to trigger the system by a "call to action" message presented in a traditional media format. The trigger system 102, upon being triggered (step 200) is designed to capture (step 202) the unique identifier capable of identifying the user mobile device 116, and optionally other data. The captured data is then forwarded (step 204) to the message application server 106. The message application server 106 then retrieves (step 206) the mobile device address of the user based on the unique identifier. The message application server 106 then executes (step 208) a programmed set of instructions whereby an appropriate response message is generated. Optionally, in step 210, all the forwarded data, and any additional data generated by the execution of the instructions in step 208 are saved in the message application database 120. The response message is then forwarded to the mobile service provider gateway 112 in step 212, for delivery to the mobile device 116 by the mobile service provider. Said user can then read said response message on said mobile device 116 in step 214.

In an alternative embodiment, step 206 is not performed in the message application server 106, but instead in the trigger system 102, and either the mobile address or both the mobile address and the unique identifier are forwarded to the message application server in step 204.

Figure 6:
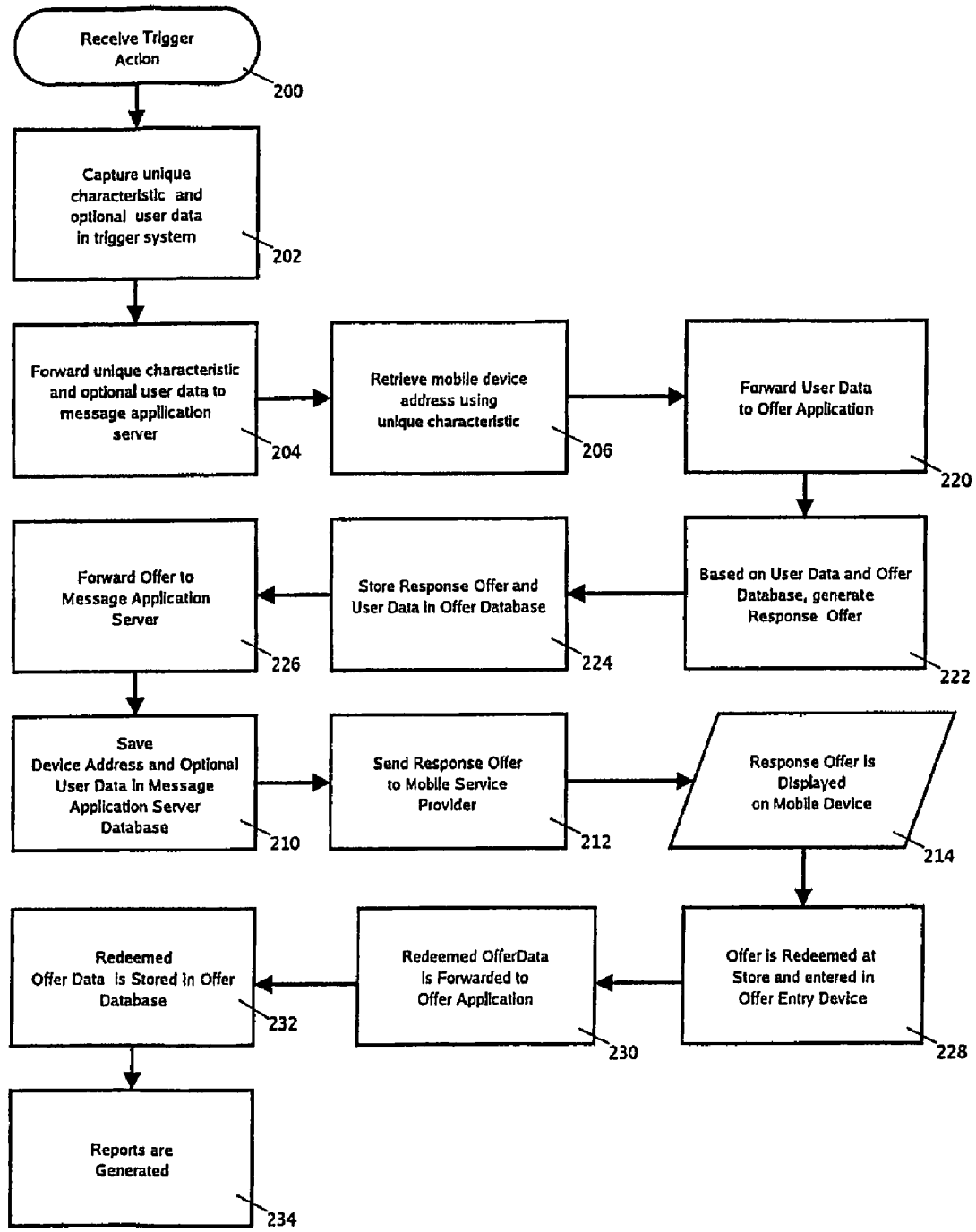
FIG. 6 is a functional block diagram containing the additional steps to deliver messages, coupons, offers or promotions to a user.

FIG. 6 illustrates the basic steps of the invention described in FIG. 5 augmented by the delivery of a coupon, offer or promotion. The trigger steps 200, 202, 204 and 206 are the same as in FIG. 5. Instead of directly generating the response message in the message application server 106, all the user data available in the message application server including the unique identifier, the mobile device address, the optional user data is forwarded to the offer application 122 (step 220). Based on all the available data, the offer server 122 generates an offer (step 222). The generated offer and any other user data is stored in the offer database 124 (step 224). The response message containing the coupon, offer or promotion is forwarded back to the message application server 106 for delivery to the mobile device 116 (step 226). The message delivery steps 210, 212 and 214 are the same as in FIG. 5. Later on the user will redeem the coupon, offer or promotion message, for example in a store. The coupon, offer or promotion being redeemed is entered (step 228) in the offer entry system 130. Either in real-time or in batch the redemption data is forwarded to the offer application 122 (step 230). The redemption data is then stored in (step 232) in the offer database 124. Based on the data stored in step 224 and step 232 in the offer database 124, reports 134 can be generated that show redemption rates from which the effectiveness of the promotion can be measured.

Figure 7:
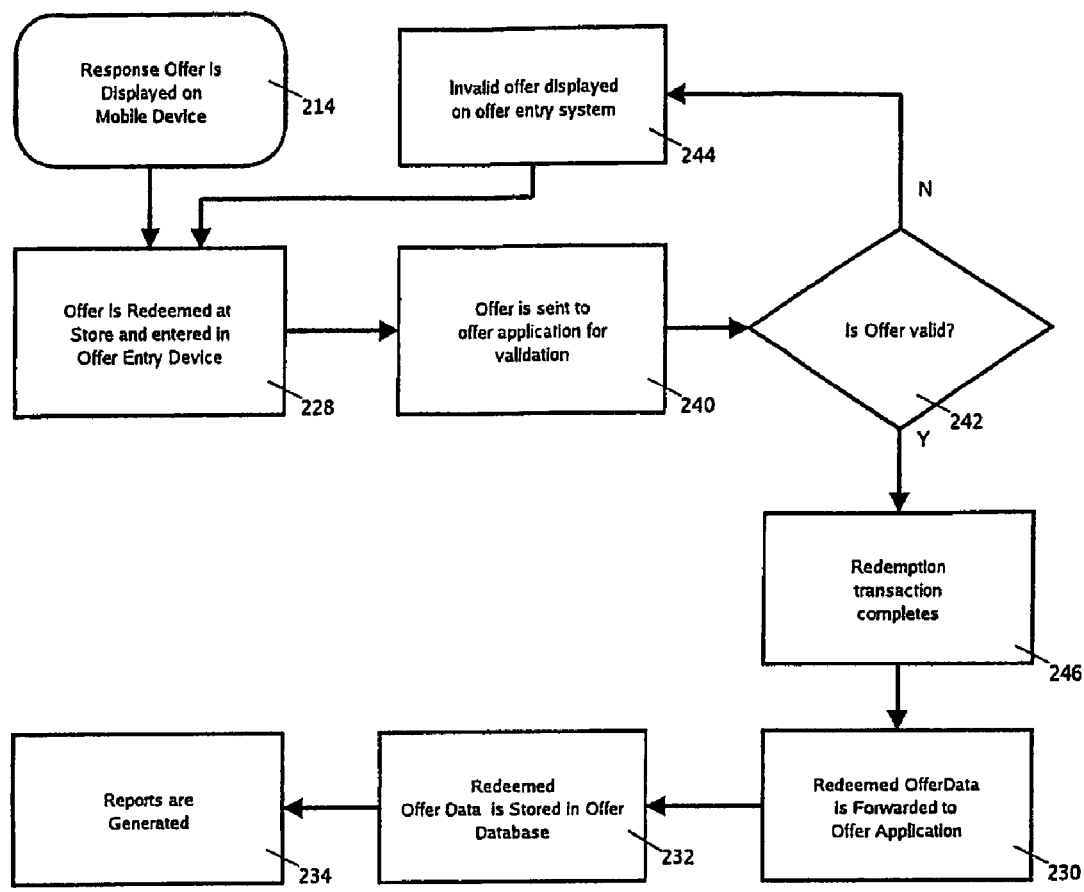
FIG. 7 is a functional block diagram of an exemplary embodiment of coupons, offers or promotion redemption.

FIG. 7 illustrates another preferred embodiment, where the coupon, offer or promotion is verified after step 228, by interrogating the offer application 122. Started from step 214 of FIG. 6, the offer is entered in the offer entry system 130 in step 228. The offer is then forwarded to the offer application 122 for verification by means of data network 132 (step 240). The offer is verified by the offer application 122 (that is the offer application verifies it's a valid offer, and has not been already redeemed if duplicate checking is configured) (step 242). If the offer is valid, then the redemption proceeds (246) and the following steps are the same as in FIG. 6. If the offer is invalid, the status is made available to the offer entry device 130 (step 244). In the case of an invalid offer, the offer may be re-entered since the offer may have been rejected due to an input error. If the offer has already been redeemed, there is no benefit in re-entering the offer.

Figure 8:
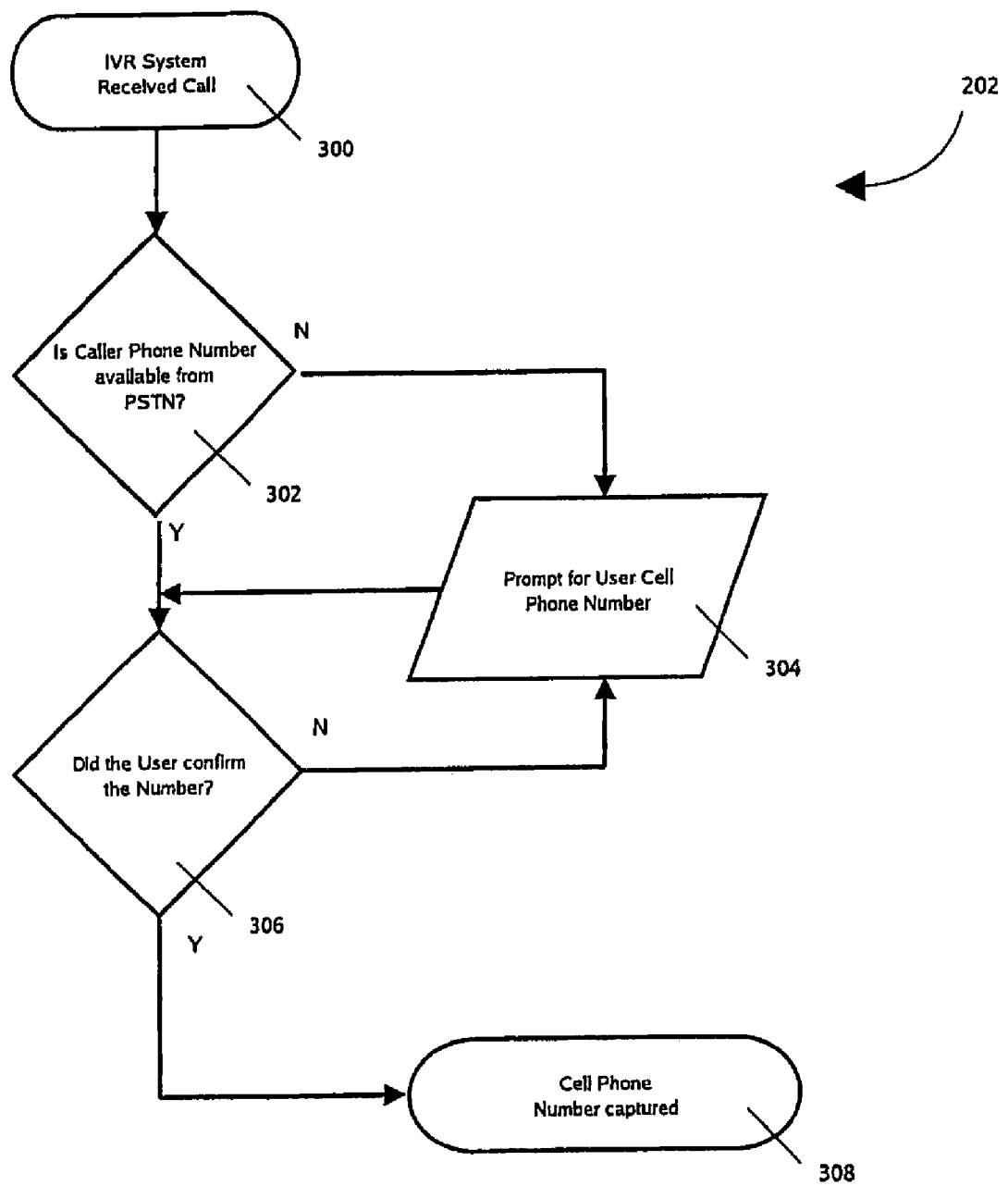
FIG. 8 is a functional block diagram to capture a user cell phone number in an embodiment of this invention where the trigger system is an IVR system.

FIG. 8 illustrates step 202 in an exemplary embodiment where the trigger system 102 is implemented using an IVR system. The user calls the IVR number. The PSTN delivers the call to the UVR system in Step 300. The IVR system is then programmed to retrieve the user calling number, using the PSTN caller id support (step 302). If the user calling number is available, the system spells out the number to the user and asks for a confirmation in step 306. If the user confirms positively, the user calling number is then forwarded to the message application server 106 as described in step 204. If the user confirms negatively (step 306), or the IVR system does not detect the user calling number in step 302 (for example if the user is blocking caller id), then the IVR is programmed (step 304) to ask the user to enter his cell phone number. The phone number can either be entered using the telephone key pad, and the IVR system will detect the Dual Tone Multiple Frequency ("DTMF") tones, or alternatively using a voice recognition system. The details on how to program an IVR system to perform the steps described above are well known to those skilled in the art.

Figure 9:
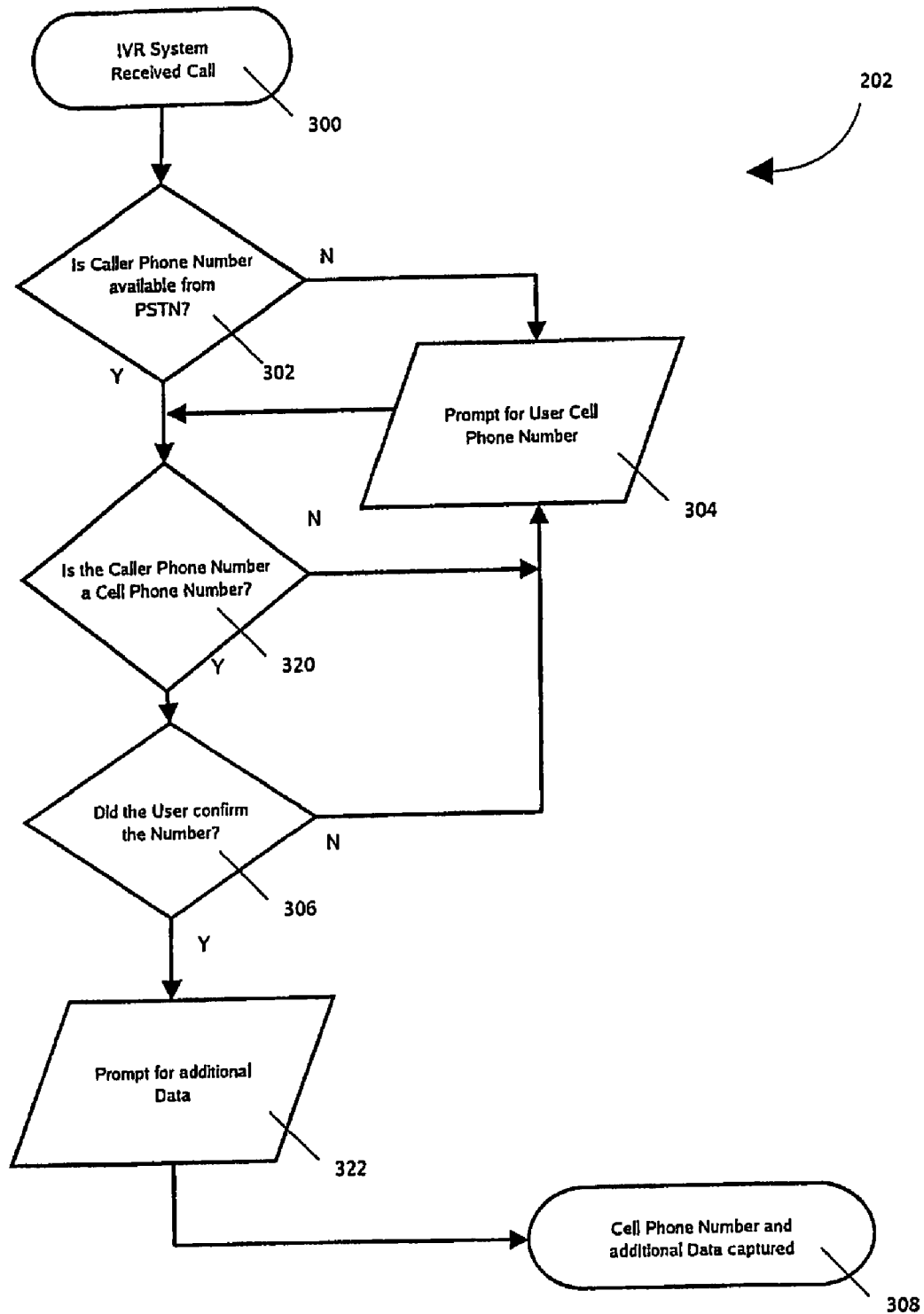
FIG. 9 is a functional block diagram of an alternative exemplary embodiment using an IVR system as a trigger system containing the additional steps of verifying if the user calling number is a wireless phone number and capturing additional data.

FIG. 9 is an alternative embodiment of step 202 that builds upon FIG. 7. In FIG. 8 the initial steps 300, and 302 are the same as in FIG. 8. The calling number supplied by the PSTN, or entered by the user is analyzed in step 320 to see if it corresponds to a cell phone number. There are multiple ways to perform this operation which are know to those skilled in the art. One possible implementation is to lookup the first six digits of the phone number in a database called the Local Exchange Routing Guide ("LERG") that contains information on all the PSTN switches. If the phone number corresponds to a cell phone number, the IVR is programmed to proceed to step 306. If the number does not correspond to a cell phone number, then the IVR is programmed in step 304 to prompt for a cell phone number as described before. In this alternative embodiment, step 322 was also added prompting the user for additional data, for example for a choice of an offer of interest or from a store of interest. Once all the additional data is captured, the user cell phone and the additional data is forwarded to the message application server 106 as described in step 204.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

In a most preferred embodiment, the various components, such as the trigger system, the message application server, the offer application, etc., are implemented on one or more computer systems. The multiplicity of the computer system allow for the distribution of the workload in accordance with, e.g., the number of computer systems available and enables the system to function even is a subset of the computer systems experience one or more faults. The computers should be connectable to each other, for example, by means of 100Base-T Ethernet interfaces and corresponding 100Base-T Ethernet switches. In the most preferred implementation, each computer contains dual UltraSPARC® III processors, 1024 MB RAM, two 9 GB disk drives, and operates using the Unix™ compatible Solaris™ operating system. As will be appreciated, the specific hardware utilized can be varied in accordance with need, required capacity, and the preferred programming and operating environment, as well as in response to other factors.

What is claimed is:

1. A system for enabling targeted content delivery to a mobile device, said mobile device having a device address, said device address having associated therewith at least one unique identifier, said system comprising:
    a message application server; and
    a trigger system in communication with said message application server, said trigger system comprising:
    a trigger client component configured to generate a trigger signal comprising a trigger action, user content request data and said at least one unique identifier; and
    a trigger server component in communication with said trigger client component, said trigger server component configured to:
    receive said trigger signal, and
    send to said message application server said trigger signal for processing by said message application server;
    wherein said message application server is configured to:
    receive from said trigger system said trigger signal, and in response thereto:
    derive said mobile device address from said at least one unique identifier,
    generate content based on said user request data, and
    send said generated content to said device address of said mobile device;
    an offer application component:
    an offer entry system in communication with said offer application component, and an offer database in communication with said offer application component for storing said generated content and said user reguest data, wherein said offer entry system is configured to:
    redeem said generated content,
    generate content redemption information comprising said redeemed content, and send said content redemption information to said offer application component for storage in said offer database.

2. A system as in claim 1 wherein said message application server further includes a message application database for storing transaction information comprising said user request data and said device address.

3. A system as in claim 1 wherein said trigger client component is said mobile device.

4. A system as in claim 1 wherein said trigger system comprises:
    a client application residing on said trigger client component for generating said trigger signal; and
    a server application residing on said trigger server component in communication with said client application and said message application server, said server application for receiving and processing said trigger signal sent by said client application.

5. A system as in claim 4 wherein said client application is a WEB or WAP browser client component and said server application is a WEB or WAP server application component.

6. A system as in claim 1, wherein said trigger client component further comprises at least one input device.

7. A system as in claim 6, wherein said at least one input device is selected from the group consisting of a magnetic card reader, bar code reader, keyboard, keypad, touch pad, sensors, and any combination thereof.

8. A system as in claim 7, wherein said sensors include a wireless sensor and a biometric sensor.

9. A system as in claim 1 wherein said trigger client component is an account card and a reader and wherein said trigger signal is generated by swiping said account card through said reader and having said trigger system identify said unique identifier based on account card information 10. A system as in claim 1, wherein said trigger system comprises an IVR system, said mobile device is a cellular phone, said device address is a cellular phone number and said trigger action is a voice call; said IVR system configured to process said trigger signal to acquire said cellular phone number of said cellular phone.

10. A system as in claim 1, wherein said trigger system comprises an IVR system, said mobile device is a cellular phone, said device address is a cellular phone number and said trigger action is a voice call; said IVR system configured to process said trigger signal to acquire said cellular phone number of said cellular phone.

11. A system as in claim 1, wherein said trigger system comprises a PSTN and a Phone Switch connected to said PSTN, said mobile device is a cellular phone, said mobile device address is a cellular phone number and said trigger action is a voice call; said trigger system configured to detect incoming call establishment requests from said PSTN and to process said trigger signal to acquire said cellular phone number of said cellular phone.

12. A system as in claim 1 wherein said mobile device is a network-enabled device.

13. A system as in claim 1 wherein said mobile device is a cellular phone having a cellular phone number as said device address.

14. A system as in claim 1 wherein said device address is a calling number, a cellular phone number, an instant messaging address, an e-mail address or other addressing type.

15. A system as in claim 1, wherein said offer application component is further configured to:
   receive said content redemption information and
   check for and process valid redeemed content using a validation code.

16. A system as in claim 15 wherein said offer entry system is further configured to generate a physical representation of said generated content.

17. A system as in claim 16 wherein said physical representation of said generated content includes paper, card-stock, plastic or any other tangible medium.

18. A system as in claim 17 wherein said offer entry system is a point of sale (POS) terminal for redeeming and providing a physical representation of said generated content.

19. A system as in claim 17 wherein said offer entry system is a kiosk for redeeming and providing a physical representation of said generated content.

20. A system as in claim 1 further comprising at least one communications network wherein said trigger system communicates with said message application server via said at least one communications network and wherein said trigger client device system communicates with said trigger server device via said at least one communications network.

21. A system as in claim 1 wherein said generated content comprises a message, a coupon, an offer or a promotion.

22. A system as in claim 16 wherein said generated content is a tangible medium containing a bar code representation of said validation code.

23. A system as in claim 22 wherein said validation code representation comprises a bar code.

24. A system as in claim 15 wherein said validation code encodes information pertaining to said user, generated content, unique identifier or mobile device for the purpose of tracking redemption on a per user basis.

25. A system as in claim 15 wherein said validation code is a numerical or alphanumerical code.

26. A system as in claim 15 wherein said validation code is an image to be scanned.

27. A system as in claim 15 wherein said mobile device processes and stores said validation code.

28. A system as in claim 15 wherein said validation code contains one or more checksum digits whereby code input errors can be detected.

29. A system as in claim 15 further comprising at least one first external system coupled to said message application server; said at least one first external system for facilitating the generation, redemption, analysis, verification and/or delivery of said generated content.

30. A system as in claim 29 wherein said at least one first external systems includes enterprise application systems, back-end payment systems, CRM systems and loyalty systems.

31. A system as in claim 16 further comprising at least one second external system coupled to said offer application component, said at least one second external system facilitating the generation, redemption, analysis, verification and/or delivery of said generated content.

32. A system as in claim 31 wherein said at least one second external system includes enterprise application systems, back-end payment systems, CRM systems and loyalty systems.

33. A system as in claim 31 wherein said validation code is similar to a Credit Card or Payment Card number and wherein said at least one second external system is a backend payment system that processes said validation code.

34. A system as in claim 1 further comprising a mobile network in communication with said mobile device and wherein said message application server sends said generated content to said device address via said mobile network.

* * * * *